United States Patent [19]

Miller

[11] 4,064,403
[45] Dec. 20, 1977

[54] RIM-TYPE HYDROELECTRIC MACHINE

[75] Inventor: Helmut Miller, Niederrohrdorf, Switzerland

[73] Assignee: Escher Wyss Limited, Zurich, Switzerland

[21] Appl. No.: 744,350

[22] Filed: Nov. 23, 1976

[30] Foreign Application Priority Data

Dec. 2, 1975 Switzerland .................. 15609/75

[51] Int. Cl.² .................. F01D 7/00; F01D 15/10; H02K 7/18
[52] U.S. Cl. ......................... 290/52; 415/133; 415/110; 415/111; 415/170 R
[58] Field of Search .................. 290/52; 415/110, 111, 415/112, 113, 129, 130, 131, 132, 133, 142, 170 A, 170 B, 170 R, 172 R, 172 A, 173 R, 173 A; 416/158; 417/355, 356

[56] References Cited

U.S. PATENT DOCUMENTS

| 3,090,654 | 5/1963 | Wald | 415/110 |
|---|---|---|---|
| 3,250,221 | 5/1966 | Williams | 415/112 |
| 3,353,028 | 11/1967 | Braikevitch | 290/52 |
| 3,422,275 | 1/1969 | Braikevitch | 417/356 |
| 3,620,639 | 11/1971 | Gaffal | 415/111 |
| 3,644,053 | 2/1972 | Braikevitch | 290/52 |
| 3,778,182 | 12/1973 | Hohn | 415/113 |
| 3,785,747 | 1/1974 | Mayo | 290/52 |

Primary Examiner—Robert K. Schaefer
Assistant Examiner—William L. Feeney
Attorney, Agent, or Firm—Robert A. Ostmann

[57] ABSTRACT

The disclosure concerns a hydroelectric machine including a tube-type hydraulic machine having a bladed wheel which carries adjustable blades, rotates about a horizontal axis and is connected with a shaft which extends into a guide blade lattice hub, and an electrical machine which surrounds the bladed wheel and has a rotor secured to an annular rim in which the external ends of the adjustable wheel blades are pivotably mounted. The rotating set is provided with three radial bearing arrangements, one being associated with the rotating unit formed by the rotor and the rim, providing sole radial support for that unit, and consisting exclusively of hydrostatic devices which support without physical contact. The other bearing arrangements are associated with the shaft at its free and bladed wheel ends, respectively. The bearing arrangement at the free shaft end and one of the other bearing arrangements center the rotating set with respect to the axis of rotation and are the only bearings which perform this function. The remaining radial bearings provide a constant supporting force when there are slow radial movements of the rotating set and a progressively increasing supporting force when there are sudden radial movements of that set.

15 Claims, 10 Drawing Figures

RIM-TYPE HYDROELECTRIC MACHINE

BACKGROUND OF THE INVENTION

This invention relates to a hydroelectric machine including a tube-type hydraulic turbine or pump having a bladed wheel which carries adjustable blades, rotates about a horizontal axis and is connected to a shaft which extends into a guide blade lattice hub, and an electrical machine which surrounds the bladed wheel and has a rotor secured to an annular rim in which the external ends of the adjustable wheel blades are pivotably mounted.

A hydroelectric machine of this kind is disclosed in Swiss Pat. No. 347,253. In that proposal, the rotating machine set is supported radially by three bearing arrangements. One of these bearing arrangements is associated with the rotating unit formed by the rotor and the rim and comprises a running drum or barrel which is secured to the rim and cooperates with sleeve bearing segments which are distributed around its periphery. The other two bearing arrangements are associated with the shaft at its free and bladed wheel ends, respectively, and each of these arrangements consists of a conventional sleeve bearing. The rotating unit and the bladed wheel were supported separately with the intent of relieving the wheel bearings of the weight of the rotating unit, and thus insuring reliable adjustability of the blades under all operating conditions. However, all attempts to construct this hydroelectric machine have in the end failed because the use of sliding surface bearing segments to support the rotating unit is problematical. The running drum is large and may have a diameter of 2 to 12 meters, and this makes it very difficult to manufacture the bearings with the required tolerances. Moreover, with such a large diameter, the unavoidable deformation of the rim attributable to dead weight, centrifugal forces and temperature fluctuations must also be taken into account. In addition, high peripheral speeds (e.g. 150 meters per second) at the rim must be accommodated. Finally, the bearing arrangement is difficult to assemble, and, during operation, it does not maintain concentricity between the rotating unit and the bladed wheel and thus causes additional forces to be imposed on the machine components.

SUMMARY OF THE INVENTION

The object of this invention is to provide an improved radial bearing scheme for a hydroelectric machine of the kind mentioned initially. As in the case of the prior machine, the new scheme employs three bearing means, the first being associated with the rotating unit and the other two being associated with the shaft at its opposite ends. However, in accordance with the invention, the bearing means have three distinguishing features which act collectively to produce the desired improvement. First, the rotating unit is supported solely by bearing means which consists exclusively of hydrostatic devices which support without physical contact. Second, the bearing means at the free end of the shaft and one of the other bearing means serve to center the rotating set, consisting of the bladed wheel and the rotating unit, with respect to the axis of rotation, and they are the only bearing means which perform this function. Finally, the remaining bearing means provide a constant supporting force when there are slow radial movements of the rotating set and a progressively increasing force when that set is suddenly displaced radially.

The new bearing scheme can be implemented using devices of relatively simple construction. Moreover, it frees the pivotal connections between the external ends of the adjustable blades and the rim of extraneous forces, and thus insures that these connections carry essentially only the loads associated with the driving torque which is transmitted between the bladed wheel and the rotating unit. This result is made possible by the fact that centering of the complete rotating set is effected by only two bearing means, and that the other bearing means follows slow radial movements of the rotating set, normally supplies a predetermined constant supporting force, and acts only in a load-relieving fashion. The weight of the bladed wheel is carried by the bearing means associated with the shaft, whereas the other bearing means carries the weight of the rotating unit. Since this last mentioned bearing means supports without physical contact, the rotating unit, at least, may float. As a result, deformations of the supporting arrangement and/or the rotating bearing surface do not affect the operation and mounting of the rotating set. In particular, no substantial wear can occur. Furthermore, since the hydrostatic supporting devices can readily follow any deformations of the rotating bearing surfaces, they will perform reliably.

BRIEF DESCRIPTION OF THE DRAWINGS

Several constructional examples of the invention are described herein in detail with reference to the accompanying drawings, which contain simplified schematic illustrations, and in which.

DESCRIPTION OF ILLUSTRATED EMBODIMENTS

Figure 1:
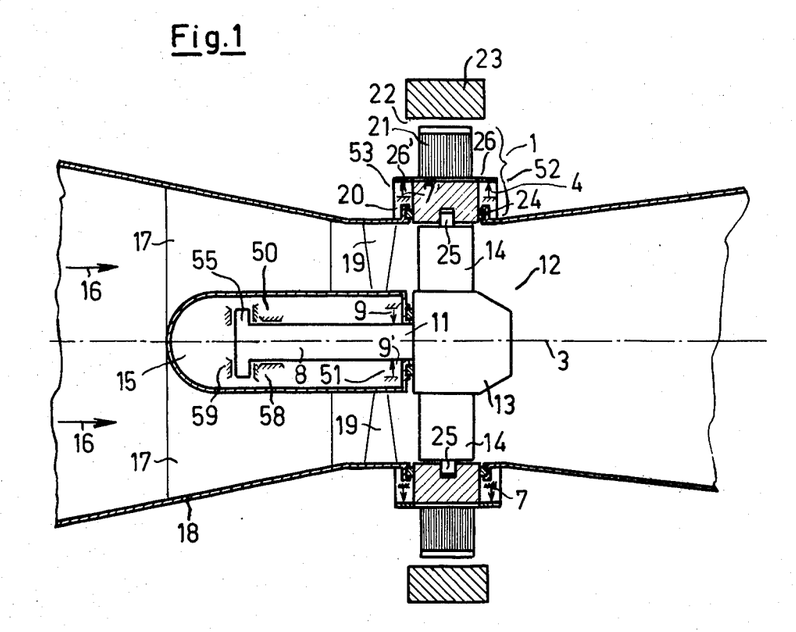
FIG. 1 is an axial sectional view of one version of the improved hydroelectric machine.

As shown in FIG. 1, the improved hydroelectric machine comprises a tube-type turbine 12 including a bladed wheel or runner 13, which is mounted on shaft 8 for rotation about a horizontal axis 3 and carries a plurality of adjustable blades 14, and a central guide blade lattice hub 15 which is arranged upstream of wheel 13 in the direction of flow of the water (see arrows 16). Hub 15 is secured to tubular housing 18 by radial partition walls 17 and supports a plurality of guide blades 19. The bladed wheel 13 is surrounded by an annular band or rim 20, in which the external end 25 of each blade 14 is mounted for pivotal movement about a radially extending axis. Rim 20, in turn, is surrounded by an electrical generator comprising a rotor 21, which is secured to the rim, and a stator 23. Sealing elements 24 are interposed between rim 20 and tubular housing 18, and additional sealing elements are provided between shaft 8 and guide blade lattice hub 15. Rim 20 and rotor 21 form a rotating unit 1, and the pivotal connections at the outer ends 25 of blades 14 transmit to this unit essentially only the driving torque supplied by bladed wheel 13.

Figure 2:
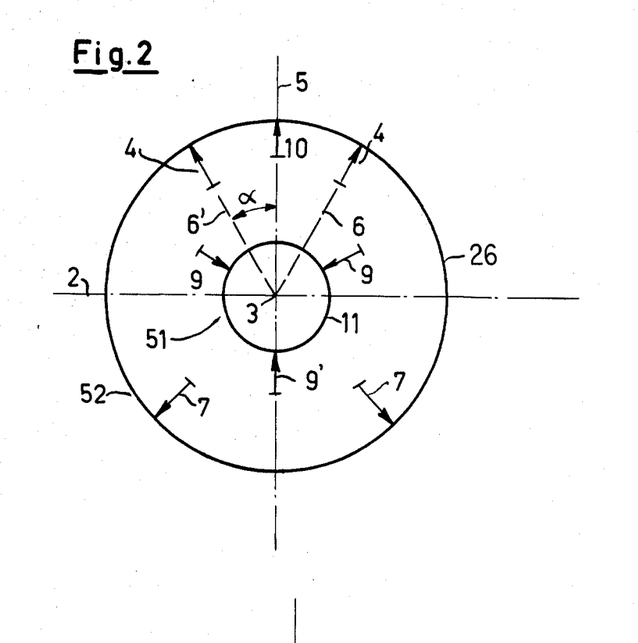
FIG. 2 is a diagram showing the arrangements of the supporting devices used in FIG. 1 for the bearing means at the wheel end of the shaft and for a portion of the bearing means of the rotating unit.

The shaft 8 of the bladed wheel 13 is provided with two bearing means 50 and 51 located, respectively, at its free end and bladed wheel end. The bearing means 50 consists of known radial sleeve bearings which form a first centering bearing for the rotating machine set consisting of bladed wheel 13 and rotating unit 1. The bearing means 51, on the other hand, consists of three hydrostatic supporting devices 9, 9' which have a damping effect without physical contact and which are arranged in the manner shown in FIG. 2. A third bearing means acts on rotating unit 1 and comprises two portions 52 and 53. Bearing portion 52 comprises an axially extending ring 26 which is fixed to the right end of rim 20 and which cooperates with a set of hydrostatic centering supporting devices 4 and a set of hydrostatic damping supporting devices 7. These devices support without physical contact and are arranged as shown in FIG. 2. The second bearing portion 53 comprises an axially extending ring 26' which is fixed to the left end of rim 20 and a cooperating set of at least three hydrostatic damping supporting devices 7' which are distributed around the circumference of the ring and which also support without physical contact.

In the diagram of FIG. 2, rotating unit 1 and the wheel end 11 of shaft 8 are shown as circular lines. As illustrated in this Figure, bearing portion 52 includes two hydrostatic centering supporting devices 4, represented symbolically by arrows, which are located above the horizontal plane 2 by containing the axis of rotation 3. These devices 4 are arranged symmetrically at opposite sides of the vertical central plane 5 containing axis 3, and their axes 6 and 6' are inclined relatively to the central plane 5 at an angle $\alpha$ of at the most 60°. Bearing portion 52 also includes two damping supporting devices 7 which are located below horizontal plane 2 and are arranged symmetrically with respect to vertical plane 5. These devices 7 support the rotating unit when sudden radial movements occur, as a result, for example, of dynamic forces, but their supporting pistons follow slow movements of the rotating unit. The two centering supporting devices 4 serve to hold rotating unit 1 concentrically with the axis 3 and also to transmit some of the weight of the rotating unit to the surrounding foundation. The remainder of the weight of the rotating unit is accepted by damping supporting devices 7' of bearing portion 53.

The two centering supporting devices 4 and the two damping supporting devices 7 shown in FIG. 2 thus form the centering bearing of the rotating unit 1, and the bearing portion 53 forms a further radial bearing whose supporting devices 7' produce a given constant supporting force when slow radial movements occur and a progressively increasing supporting force when sudden radial movements occur.

As already mentioned, the bearing means 51 of bladed wheel 13 consists of three damping supporting devices 9, 9' which are distributed around the periphery of the shaft 8 and are of the same construction as the damping supporting devices 7 and 7'. As FIG. 2 shows, a damping supporting device 9' is positioned below plane 2 in the vertical plane 5, whereas the two other damping devices 9 are located above plane 2 and are arranged symmetrically with respect to plane 5. The hydrostatic supporting devices 9, 9' are thus capable of holding shaft 8, and consequently bladed wheel 13, in the particular position concerned without physical contact when dynamic forces and sudden radial movements associated therewith take place, whereas they follow slow radial movements of the bladed wheel. The supporting device 9' situated in the central plane 5 also carries a proportion of the weight of bladed wheel 13 and shaft 8.

Figure 5:
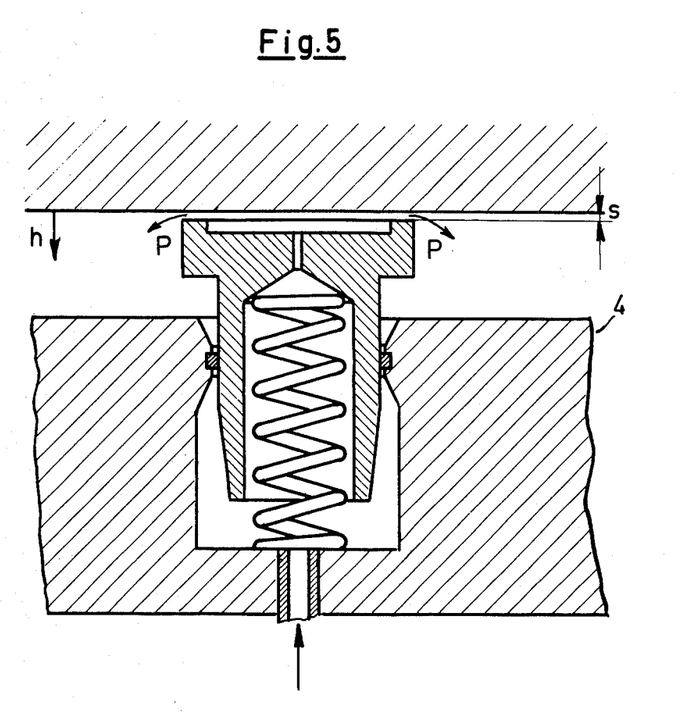
FIG. 5 is a sectional view of a hydrostatic centering supporting device.
Figure 5A:
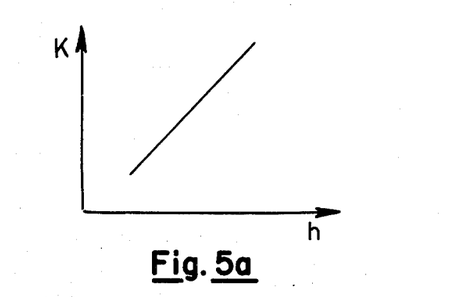
FIG. 5a is the force vs. travel diagram for the supporting device of FIG. 5.
Figure 6:
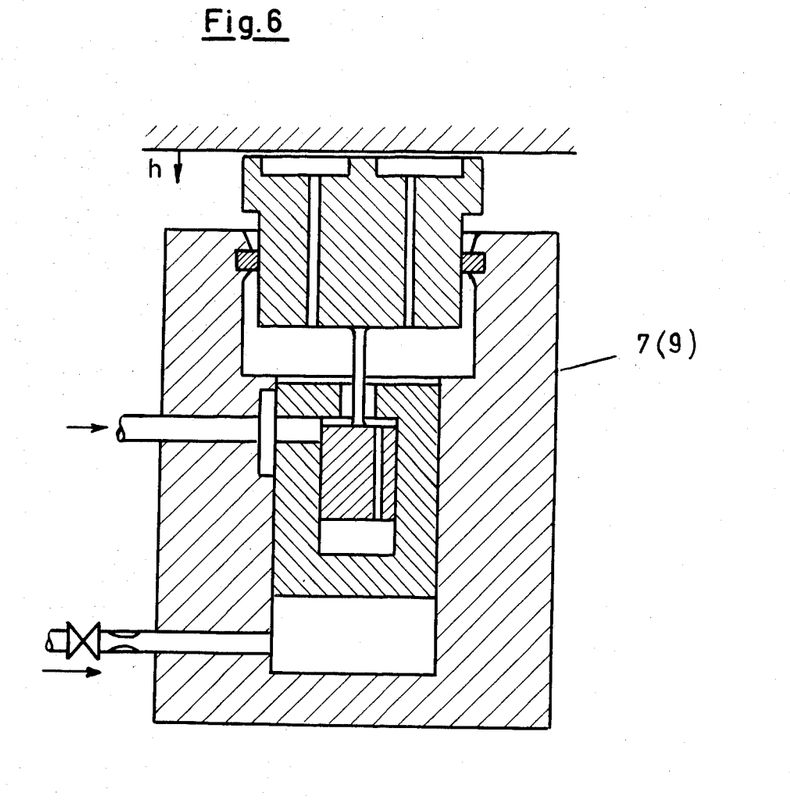
FIG. 6 is a sectional view of a hydrostatic damping supporting device.
Figure 6A:
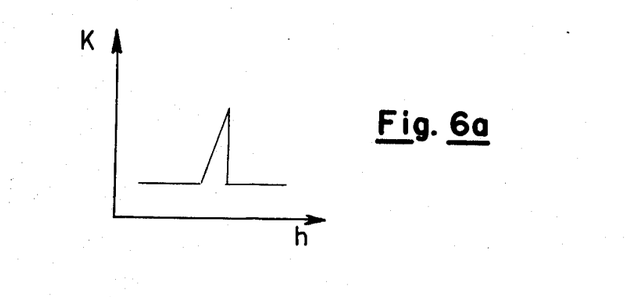
FIG. 6a is the force vs. travel diagram for the supporting device of FIG. 6.

One example of a hydrostatic centering supporting device 4 is shown if FIG. 5 and is described in detail in U.S. Pat. No. 3,994,367, issued Nov. 30, 1976. Other examples of this device are disclosed in U.S. application Ser. No. 744,252 filed concurrently herewith. FIG. 6 shows one version of the hydrostatic damping supporting device 7, 7', 9 and 9'. This constructional example, as well as several others are described in detail in U.S. application Ser. No. 744,319 filed concurrently herewith. The force vs. travel characteristics of the centering and damping devices, respectively, are represented in the diagrams of FIGS. 5a and 6a.

In the embodiment of FIGS. 1 and 2, the rotating machine set comprising rotating unit 1 and bladed wheel 13 is centered by the bearing means 50 acting on the free shaft end and the centering supporting devices 4 of bearing portion 52, which act on the rotating unit. At the same time, centering supporting devices 4 take up a part of the weight of the rotating unit. The two damping supporting devices 7 of bearing portion 52 and the damping supporting pistons 7' of bearing portion 53 support rotating unit 1 against sudden radial movements, and the damping supporting devices 9 and 9' perform a similar function for shaft 8 and bladed wheel 13. The remainder of the weight of unit 1 is carried by those damping supporting devices 7' of portion 53 which act in the upward direction. The weight of shaft 8 and wheel 13, on the other hand, is carried in part by damping supporting device 9' and in part by bearing means 50.

Instead of the internal bearing arrangement of FIG. 2, it is possible to support rotating unit 1 by an external bearing arrangement. In this alternative, the centering supporting devices 4 would act on the outer peripheral surface of ring 26 and be located below horizontal plane 2. However, these devices 4 still would be arranged symmetrically with respect to central vertical plane 5. The two damping supporting devices 7 also would act on the outer surface of ring 26 and be arranged symmetrically with respect to vertical plane 5, but they, of course, would be located above horizontal plane 2. Similarly, the devices 7' of bearing portion 53 would be arranged to act on the external surface of ring 26'. The alternative arrangement of the bearing portions 52 and 53 does not affect bearing means 51, so damping supporting devices 9 and 9' would still be arranged as shown in FIG. 2.

In both of the cases mentioned above, it is possible to provide in each bearing plane more than two centering supporting devices 4 and/or more than two damping supporting devices 7 or 7'. When an odd number of devices is used, one is located in central plane 5, and the others of that type are arranged symmetrically at opposite sides of that plane. On the other hand, if an even number of devices is employed, they are arranged symmetrically at opposite sides of central plane 5, as in the case of FIG. 2.

Figure 7:
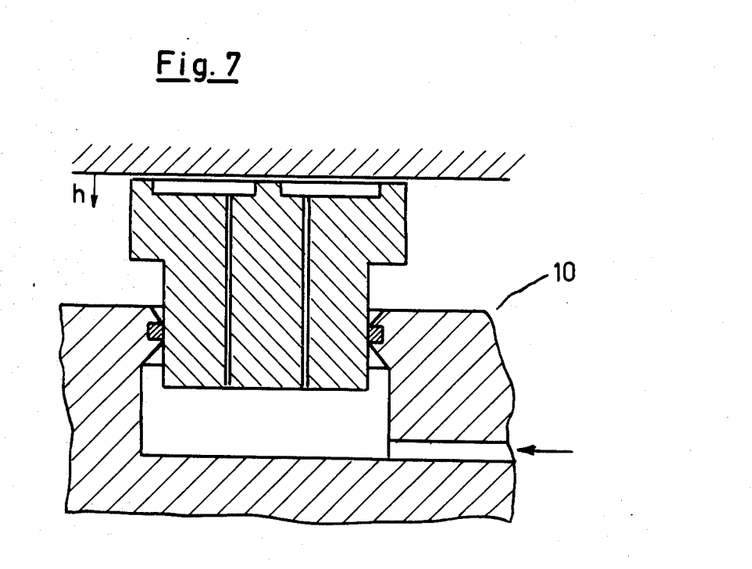
FIG. 7 is a sectional view of a hydrostatic loadbearing device.
Figure 7A:
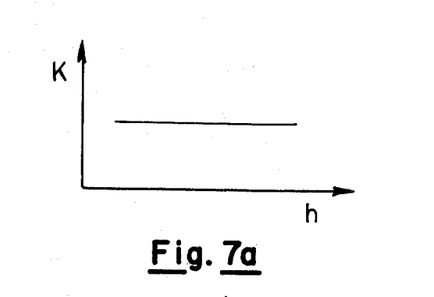
FIG. 7a is the force vs. travel diagram for the device of FIG. 7.

In very large machines, it is also possible to include in bearing portion 52, and, if desired, in portion 53, a follow-up hydrostatic load-bearing device 10 which is located in vertical central plane 5 and which carries without physical contact a constant portion of the weight of the rotating unit. This measure, of course, reduces the portions of the weight of unit 1 which must be accepted by centering supporting devices 4 and damping supporting devices 7'. A constructional example of a hydrostatic load-bearing device 10 is illustrated in FIG. 7 and is described in detail in U.S. Pat. No. 3,802,044, issued Apr. 9, 1974.

In addition to the radial bearing means 50-53, the FIG. 1 embodiment also includes two bearing means 58 and 59 which act on the opposite faces of a flange 55 situated on the free end of shaft 8. The bearing means 58 accepts the axial thrust exerted on bladed wheel 13 by the flowing water during normal operation. Since there may be a reversal of the axial thrust, for example when there are load switch-offs, the counter-bearing 59 is provided. The two bearing means 58 and 59 in FIG. 1 consist of known hydrodynamic bearing segments.

Figure 3:
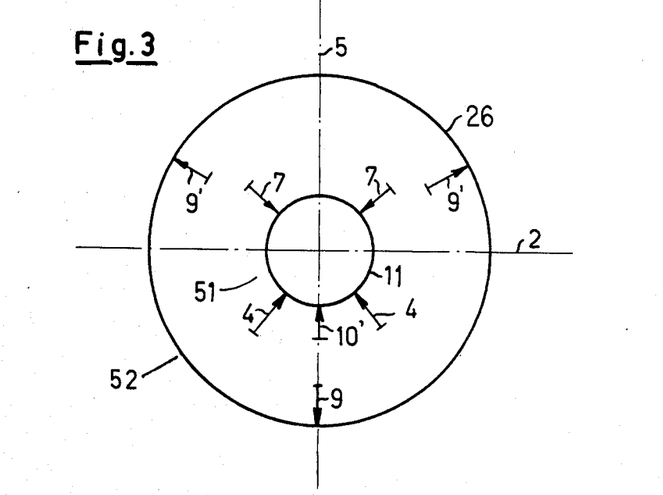
FIG. 3 is a diagram similar to FIG. 2, but showing alternative arrangements of the supporting devices.

FIG. 3 depicts an embodiment in which the rotating set is centered by bearing means 50 and 51, rather than by bearing means 50 and bearing portion 52. In this case, the bearing means 51 which acts on end 11 of shaft 8 consists of two hydrostatic centering supporting devices 4 which are located below the horizontal plane 2, and two damping supporting devices 7 which are located above that horizontal plane. In addition to their centering function, the devices 4 here also take up the weight of the bladed wheel. The bearing portion 52 for the rotating unit in FIG. 3 consists of three damping supporting devices 9, 9' which are distributed around the periphery of ring 26; the two devices 9' being effective above horizontal plane 2, and the third device 9 being effective below this plane. The devices 9' carry the weight of the rotating unit and, together with the third device 9, hold the rotating unit against sudden radial movements. As before, the devices 9, 9' follow slow radial movements of the associated rotating part, in this case unit 1. The bearing means 51 of FIG. 3 may also include at least one hydrostatic follow-up load-bearing device 10' which takes a constant proportion of the weight of bladed wheel 13, and thus correspondingly reduces the weight load carried by centering supporting devices 4 and bearing means 50. The portions 52 and 53 of the bearing means acting on the rotating unit may also include at least one hydrostatic load-bearing device which accepts a constant proportion of the weight of the rotating unit and cooperates with the internal side of ring 26 or 26', as in the case of the damping supporting devices 9, 9'.

As an alternative to the arrangement of FIG. 3 the damping supporting devices 9, 9' can act from the outside instead of from the inside. In this case, device 9 would lie in plane 5 and be positioned above horizontal plane 2, and the two devices 9' would be located below plane 2 and arranged symmetrically with respect to central vertical plane 5. If the alternative employs a hydrostatic load-bearing device for taking up a constant portion of the weight of unit 1, it would be positioned below plane 2 and act in plane 5.

It might be remarked here that the various radial supporting arrangements may employ a plurality of centering, damping and load-bearing supporting devices, with like devices being aligned in a row in the axial direction.

Figure 4:
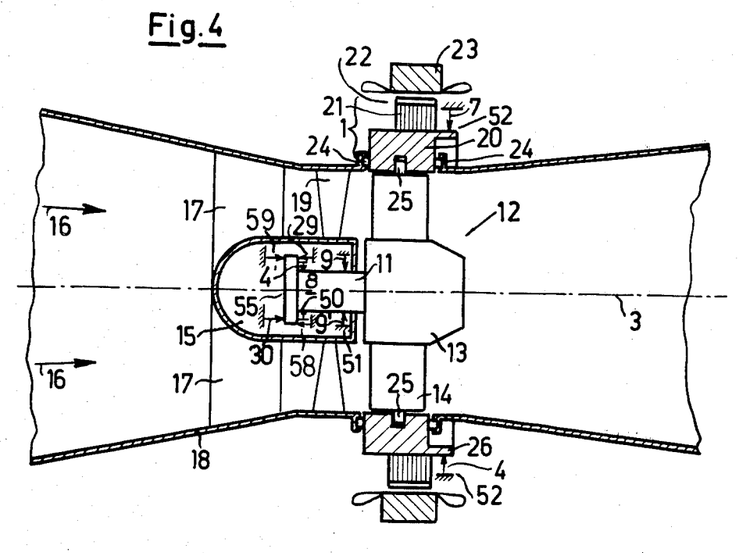
FIG. 4 is an axial sectional view of another version of the improved hydroelectric machine.

In the constructional example shown in FIG. 4, the rotating unit 1 is supported radially by an external bearing arrangement, rather than by an internal arrangement as in FIG. 1. Furthermore, in this embodiment, the rim 20 and the rotor 21 are offset relatively to one another in the axial direction so that the center of gravity of the rim and the center of gravity of the rotor do not lie in the same radial plane. As a result, it is possible here to support rotating unit 1 solely by means of the bearing portion 52 at the right side of that unit. The bearing portion 52 in this case comprises two centering supporting devices 4 which are positioned symmetrically at the two sides of the vertical central plane and located below the central horizontal plane, and two damping supporting devices 7 which are located above the aforesaid horizontal plane and also are positioned symmetrically relatively to the central vertical plane. All of these devices 4 and 7 act on the outer peripheral surface of ring 26. Of the supporting devices 4 and 7, only one each is visible in FIG. 4, and it is shown swung over into the drawing plane. The centering supporting pistons 4 center the rotating machine set and at the same time carry the weight of the rotating unit.

The bearing means 51 at the wheel end 11 of the shaft 8 in FIG. 4 is constructed in the same way as its counterpart in FIG. 2. Thus, this bearing means includes a damping supporting device 9' which carries a part of the weight of bladed wheel 13 and which, together with two other damping supporting devices 9, supports the bladed wheel against sudden radial displacements when dynamic forces occur. When there are slow radial movements of bladed wheel 13, the damping devices 9, 9' follow, so that the bladed wheel is always situated concentrically with respect to the rotating unit. The bearing means 50, however, comprises three hydrostatic centering supporting devices 4' which are distributed around the periphery of shaft 8. Thus, in contrast to its counterpart in the first embodiment, the bearing means 50 here supports without physical contact. The supporting devices 4' act jointly with the centering supporting devices 4 of bearing portion 52 to center the rotating machine set.

As in the first embodiment, the free end of shaft 8 in FIG. 4 comprises a flange 55 having opposed faces which cooperate with axial bearing means 58 and 59, respectively. However, in this case, the bearing means 58 comprises at least two hydrostatic centering supporting devices 29, and the bearing means 59 comprises at least two hydrostatic damping supporting devices 30. The supporting devices 29 may be constructed in the same way as the centering supporting devices 4, and they accept without physical contact the axial thrusts which occur during normal operation. Supporting devices 30, on the other hand, may be constructed in the same way as damping supporting devices 7 and 9, and, therefore, they follow slow axial movement of the bladed wheel, but support the wheel against sudden movement caused by the reverse forces which may occur when the generator is switched off or the guide blade lattice is suddenly closed.

In cases where the bearing means associated with the rotating unit 1 performs a centering function, the bearing means 51 at the wheel end 11 of shaft 8 may consist of hydrodynamic bearing segments which are so constructed that they produce a substantially constant supporting force when there are slow radial movements, but produce a progressively increasing supporting force when there are sudden radial movements. A hydrodynamic bearing segment of this type is disclosed in FIG. 1 of the aforementioned U.S. application Ser. No. 744,319.

It also should be observed that it is possible to employ mirror image versions of the arrangements of the damping supporting devices shown in FIGS. 2 and 3. With such a change, the FIG. 2 scheme would provide two supporting devices to carry part of the weight of bladed wheel 1, rather than one device as in the original version. Similarly, in the case of FIG. 3, the number of damping supporting devices which carry a part of the weight of the rotating unit would be reduced from two to one.

It should also be noted that the pistons of those damping supporting devices which have to carry part of the weight of the bladed wheel or of the rotating unit are acted upon with a higher pressure than the pistons of the damping supporting devices which belong to the same bearing plane and which perform only a damping function.

I claim:

1. A hydroelectric machine comprising
  a. a tube-type hydraulic machine having a guide blade lattice hub, a bladed wheel which rotates about a horizontal axis and carries adjustable, radially extending blades, and a shaft which is connected with the bladed wheel, extends into said hub, and has a free end in the hub;
  b. an annular rim surrounding the bladed wheel and in which the external ends of the adjustable wheel blades are pivotably mounted;
  c. an electrical machine surrounding the rim and having a rotor secured to the rim, the rotor and rim forming a rotating unit, and said unit and bladed wheel forming a rotating set;
  d. first bearing means providing sole radial support for the rotating unit and consisting exclusively of hydrostatic devices which support without physical contact; and
  e. second and third radial bearing means acting on the shaft, the second bearing means being located at said free end of the shaft and the third bearing means being located adjacent the bladed wheel,
  f. the second bearing means and one of the first and third bearing means serving to center said rotating set with respect to the axis of rotation and being the only bearing means which perform this function, and
  g. the remaining bearing means producing a constant supporting force when there are slow radial movements of said rotating set and a progressively increasing supporting force when there are sudden radial movements of that set.

2. A machine as defined in claim 1 in which
  a. said third bearing means comprises at least three damping supporting devices which damp sudden radial movements of the bladed wheel and of which at least one device serves to accept at least a part of the weight of the bladed wheel; and
  b. said first bearing means comprises at least two hydrostatic centering supporting devices, and at least one hydrostatic damping supporting device which damps sudden radial movements of said rotating unit.

3. A machine as defined in claim 2 in which said hydrostatic centering supporting devices of the first bearing means are arranged to accept at least a part of the weight of said rotating unit.

4. A machine as defined in claim 2 in which said first bearing means includes hydrostatic damping supporting devices which are arranged to accept at least a part of the weight of said rotating unit.

5. A machine as defined in claim 4 in which said first bearing means includes at least one hydrostatic follow-up device which accepts a constant portion of the weight of said rotating unit.

6. A machine as defined in claim 2 in which said first bearing means includes at least one hydrostatic follow-up device which accepts a constant portion of the weight of said rotating unit.

7. A machine as defined in claim 2 in which said second bearing means comprises hydrodynamic centering bearings.

8. A machine as defined in claim 2 in which said second bearing means comprises at least three hydrostatic centering supporting devices which are distributed around the circumference of the shaft and act on the shaft without physical contact.

9. A machine as defined in claim 1 in which
  a. said third bearing means comprises at least two centering supporting devices and at least one damping supporting device which damps sudden radial movements of the bladed wheel; and
  b. said first bearing means comprises at least three hydrostatic damping supporting devices which damp sudden radial movements of said rotating unit and of which at least one device serves to accept at least a part of the weight of said rotating unit.

10. A machine as defined in claim 9 in which said third bearing means includes at least one hydrostatic follow-up load-bearing device which accepts without physical contact a constant portion of the weight of the bladed wheel.

11. A machine as defined in claim 9 in which said second bearing means comprises hydrodynamic centering bearings.

12. A machine as defined in claim 9 in which said second bearing means comprises at least three hydrostatic centering supporting devices which are distributed around the circumference of the shaft and act on the shaft without physical contact.

13. A machine as defined in claim 1 which includes
  a. a flange carried by the shaft at its free end and having a face directed toward the bladed wheel; and
  b. at least two circumferentially spaced hydrostatic centering supporting devices which cooperate with said face of the flange and accept without physical contact the axial thrusts which are imposed on the rotating set in normal operation.

14. A machine as defined in claim 13 which includes
  a. a second face on said flange which is directed away from the bladed wheel; and
  b. at least two circumferentially spaced hydrostatic damping supporting devices which act on said second face without physical contact and damp sudden axial movements of the rotating set resulting from reverse axial thrusts.

15. A machine as defined in claim 1 in which said first bearing means comprises two portions, one being located at each side of the rotating unit.

* * * * *